United States Patent [19]
Bird

[11] 3,748,041
[45] July 24, 1973

[54] LASER BEAM ATTITUDE CONTROL DEVICE

[75] Inventor: Robert J. Bird, Southbridge, Mass.

[73] Assignee: American Optical Corporation, Southbridge, Mass.

[22] Filed: Jan. 31, 1972

[21] Appl. No.: 222,239

[52] U.S. Cl. .................................. 356/149, 33/286
[51] Int. Cl. .................................. G01c 1/10
[58] Field of Search ................. 356/149, 138, 153, 356/172, 250; 33/286

[56] References Cited
UNITED STATES PATENTS
3,635,565  1/1972  Colson .............................. 356/153
3,462,845  8/1969  Matthews ........................... 33/286
3,588,249  6/1971  Studebaker ....................... 356/172

FOREIGN PATENTS OR APPLICATIONS
29,462  4/1911  Great Britain ....................... 356/250

Primary Examiner—Edward S. Bauer
Attorney—William C. Nealon et al.

[57]  ABSTRACT

A mirror operatively connected between a frame and a plumb mechanism so that any angular displacement, through an angle of $2\theta$, of the frame relative to the plumb effects a corresponding angular displacement, through an angle of $\theta$, of the mirror relative to the plumb. A laser is mounted to the frame and emits along an axis toward the mirror. The mirror will reflect light from the laser at a constant angle relative to the vertical. The laser is adjustably mounted so as to preset the orientation of the reflected beam.

4 Claims, 4 Drawing Figures

PATENTED JUL 24 1973
3,748,041
SHEET 2 OF 2
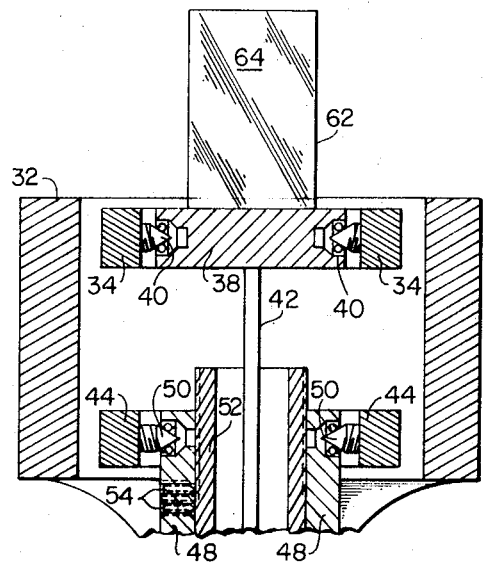
Fig. 2
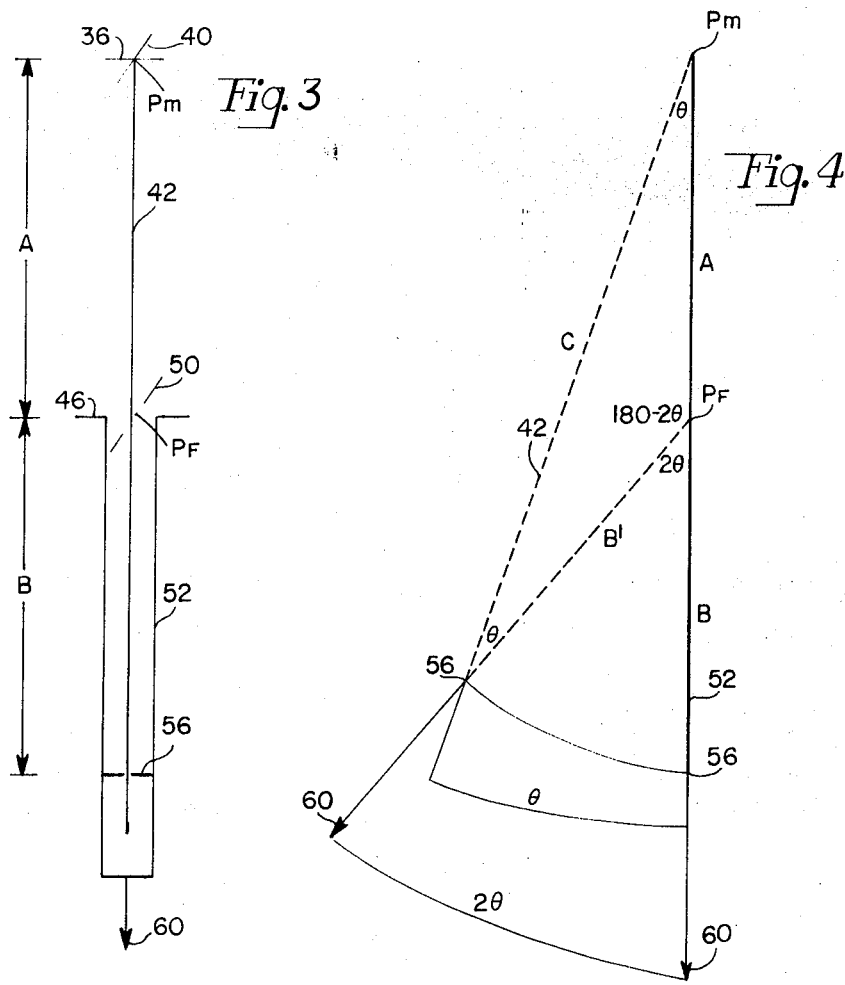
Fig. 3
Fig. 4

LASER BEAM ATTITUDE CONTROL DEVICE

BACKGROUND OF THE INVENTION

The present invention is related to surveying apparatus of the type in which a light beam, especially a laser beam, is used as the alignment reference. More particularly, this invention relates to an apparatus for the orientation of such a laser beam and for the maintenance of this orientation in a portable apparatus.

This invention will find applicability in the field of surveying and in construction projects and the like wherein the instrument would be used under less than laboratory conditions. One such use in the laying of pipelines, where it is sometimes essential that the pipe be maintained either at a level condition or at a certain angle of incline for the flow of fluids therethrough. Due to the physical environment involved in such a project, it is sometimes a problem to maintain the desired orientation of the laser beam with precision. The classical tripod method of maintaining stability is not always practicable. As a result, it has been found necessary to provide some other measure of stability to insure that the surveying laser beam has a constant orientation in space relation to the vertical despite angular movements of the instrument itself.

SUMMARY OF THE INVENTION

It is therefore an object of the present invention to provide a compensating instrument to insure and maintain a desired orientation of a surveying laser beam despite shifts of the apparatus about any horizontal axis.

Other objects, advantages, and features of this invention will become apparent from the following description of one embodiment thereof, when taken in connection with the accompanying drawing.

Briefly, this invention is practiced in one form by a mirror inclined at 45° and gimbal-mounted relative to a frame so as to be freely rotatable about mutually perpendicular horizontal axes. A suspended plumb is separately gimbal-mounted so as to freely assume a plumb attitude. Coaction between the plumb and the mirror mount causes the mirror to angularly displace by exactly half the amount of any relative angular displacement between the plumb and the frame. A beam from a laser mounted to the frame thereby reflects from the mirror in a constant orientation relative to the vertical despite angular movements of the frame. The angular disposition of the laser relative to the frame is controllable to adjust the reflected beam to a desired attitude relative to the vertical.

DRAWING

FIG. 2 is a front sectional view of a part of FIG. 1, taken along the lines II—II thereof.

FIGS. 3 and 4 are schematic diagrams illustrating one of the principles of this apparatus.

DESCRIPTION

Figure 1:
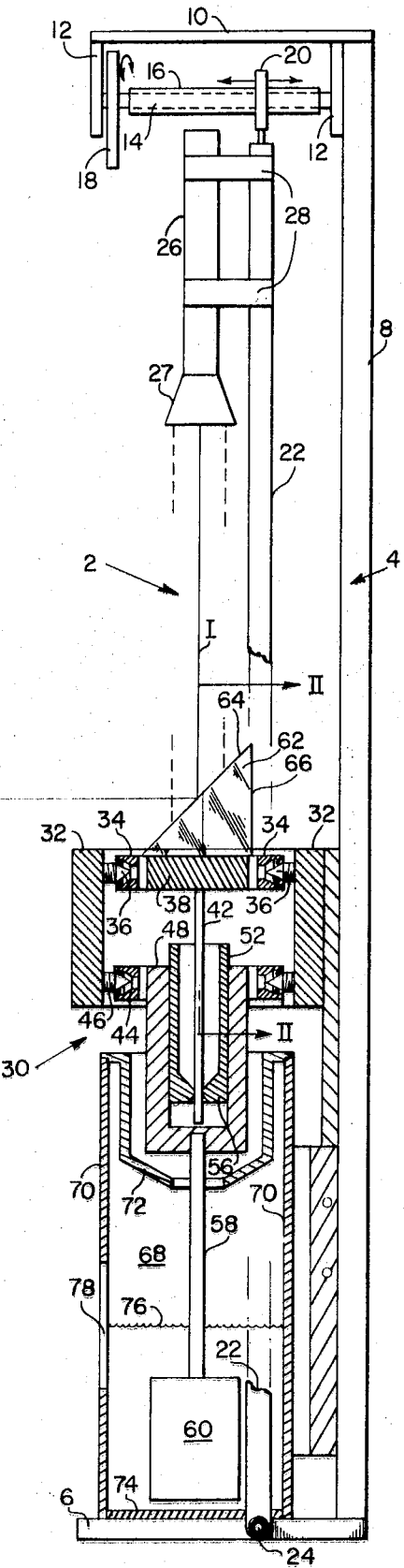
FIG. 1 is a side view, partly in section of a laser beam orientation apparatus according to this invention.

Referring now to FIG. 1, a laser beam orientation apparatus is generally indicated at 2 and includes a frame which again is generally indicated at 4. Frame 4 includes a base 6, an upright 8, and a top portion 10. A pair of flanges 12 depend from top 10 and rotatably support a shaft 14 which includes screw threads 16 and is hand operated by a hand wheel 18. A nut member 20 is disposed on the screw threads 16 for cooperation therewith. Nut member 20 is mounted on an adjustment arm 22 which is rotatably fastened by means of a suitable bearing 24 relative to frame 4 at or near the base thereof. Arm 22 is shown broken away for clarity. A laser 26 is fixed relative to adjustment arm 22 by means of suitable brackets or fasteners 28. Laser 26 also may include an integral beam spreader 27.

A compensating mirror apparatus, generally indicated at 30 is also mounted relative to frame 4 on its base 6 and includes an upper box frame 32 which is open at its top and bottom and is integral with the frame 4. Box frame 32 supports a horizontally disposed outer mirror gimbal ring 34 by means of a pair of needle bearings 36. Outer gimbal ring 34 supports an inner mirror gimbal member 38 on a pair of needle bearings 40. Bearings 36 are oppositely disposed relative to each other, and together they are displaced 90° from bearings 40 which are also oppositely disposed relative to each other. A spindle 42 depends from the center of the inner mirror gimbal member 38.

Box frame 32 similarly supports an outer plumb gimbal ring 44 on needle bearings 46 and outer ring 44 supports an inner plumb gimbal sleeve 48 on needle bearings 50. Within the inner plumb gimbal sleeve 48, a fulcrum sleeve 52 is set by suitable set screws 54 at a controlled depth within the gimbal sleeve 48. Fulcrum sleeve 52 is open at both ends and includes an inwardly extending circumferential flange 56 which defines a circular aperture through which spindle 42 fits with a close tolerance. The inner periphery of flange 56 is substantially pointed so as to provide circumferential line contact with the spindle 42.

The gimballed sleeve 48 is substantially a cylindrical cup from the center of which a plumb spindle 58 depends and connects to a plumb bob 60. The spindle 58 is coaxial with gimbal sleeve 48 and fulcrum sleeve 52 so that sleeve 48 and sleeve 52 are in a plumb position under the influence of plumb bob 60.

A compensating mirror 62 is mounted atop the inner mirror gimbal member 38. Mirror 62 is preferably a 45° reflecting surface 64 on a right angle prism 66 as shown, but, of course, other angles could be used.

The plumb bob 60 preferably is enclosed within a chamber 68 defined by side members 70, an apertured top 72 through which the plumb spindle 58 extends, and a bottom 74. To provide some damping of the motion of this apparatus, a liquid 76 of medium viscosity such as oil or glycerin is used. In order to observe the level of liquid 76 within chamber 68, a glass or plastic window 78 may be provided.

To protect this apparatus from the elements, it may be desirable to have the entire unit enclosed within a suitable frame enclosure. Such an enclosure is not shown for the sake of clarity, but its only requirement is that it be transparent to the laser beam reflected from the compensating mirror 62.

Referring now to FIG. 3, the gimbal-mounted apparatus above described is shown schematically and shows the mutually perpendicular horizontal axes of bearings 36 and 40 intersecting at pivot point Pm from which the spindle 42 depends, and the axes of bearings 46 and 50 intersecting at pivot point Pf from which the fulcrum sleeve 52 depends. The dimension A is the dimension between the pivot point Pm and Pf, and dimension B is the dimension between the pivot point Pf and the fulcrum flange 56. A and B are equal.

Referring now to FIG. 4, it will be appreciated that any angular displacement, through an angle of 2θ, of the plumb 60 (and therewith the sleeve 52) results in a triangle of sides A, B', and C. This triangle is always an isosceles triangle since A=B=B'. Therefore, any displacement of the plumb and sleeve 52 through an angle 2θ relative to the frame results in a corresponding angular displacement through an angle θ, or exactly half of 2θ, of the spindle 42.

It will be apparent from the foregoing that the mirror which is fixed relative to spindle 42 will angularly displace to exactly half the extent of any angular displacement which occurs between the frame and the plumb. In operation, the plumb bob, of course, remains in a plumb position and it is the movement of the frame with which this invention is concerned. However, its operation can more easily be visualized by considering the frame to be stationary and moving the plumb bob through an angular displacement. In such an invertion as exemplified in FIGS. 3 and 4, an angular displacement of the plumb mechanism through an angle 2θ will effect the angular displacement of the compensation mirror through an angle θ. The incident beam from the frame-mounted laser is reflected by the displacement mirror at an angle of 2θ from the direction of its reflection before the displacement. That is, the plumb mechanism has displaced through angle 2θ and the reflected laser beam has likewise displaced in the same direction through angle 2θ. Translating this now to the actual case in which the frame and laser move instead of the plumb, a movement of the frame through angle 2θ relative to the vertical, effects the displacement of the reflected beam through the same angle 2θ relative to the frame. The reflected beam thus remains fixed relative to the vertical (that is, relative to the earth).

Referring back to FIG. 1, a laser 26 is shown fixedly mounted on adjustment arm 22 which is pivotable at one of its ends about the bearing 24. This pivot action is motivated and controlled by the screw and nut mechanism 16, 20 which is operated by means of hand wheel 18. The purpose of this pivot action is to set the laser axis in a desired attitude so as to thereby determine the desired orientation, relative to the vertical, of the reflected light from compenstating mirror 62. In the drawing, the incident radiation is shown propogating along a vertical axis of incidence I and reflected along a horizontal axis of reflection R. From this as a starting reference, if it is desired to direct the reflected beam at a downward angle from the axis R, the screw and nut mechanism 16, 20 is used to swing the adjustment arm 22 and laser 26 in a clockwise direction to a desired extent. Conversely, to raise the reflected beam above the axis R, the adjustment arm and laser are swung counter-clockwise to a desired extent. The angle through which the adjustment arm is moved about its fulcrum point (bearing 24) equals the angle through which the reflected beam is displaced by such adjustment. By means of a relatively long adjustment arm 22, a fine pitch screw thread 26, and incremental calibrations on hand wheel 18, the angular disposition of laser 26 is capable of very fine adjustment. Once the laser is adjusted in the desired attitude, the compensating mirror operates to reflect the laser light along the desired direction.

The apparatus herein described is capable of maintaining the desired orientation of a light beam despite angular movements of the instrument relative to the vertical axis. Of course, as the entire instrument is rotated about its vertical axis, such as axis I, the axis of reflection R will be swept from its target, but the orientation of the reflected beam relative to the vertical axis remains constant.

The foregoing description of an embodiment of this invention is given by way of illustration and not of limitation. The concept and scope of the invention are limited only by the following claims and equivalents thereof which may occur to others skilled in the art.

What is claimed is:

1. A light beam orientation control apparatus comprising:
   a frame,
   a light source mounted relative to said frame to direct collimated light along an axis of incidence,
   a compensating mirror gimbal-mounted relative to said frame and disposed on said axis of incidence in the path of light from said source to reflect said light along an axis of reflection,
   a plumb mechanism freely depending from said frame to assume a plumb attitude relative to the earth,
   coacting means interposed between and coacting with said mirror and said plumb mechanism to effect an angular displacement of said mirror relative to said frame equal to half of any angular displacement of said plumb mechanism relative to said frame, so that said axis of reflection remains at a constant angle with the vertical despite angular shifts of the apparatus relative to the vertical,
   said light source being angularly adjustable relative to said frame to adjustably move said axis of incidence and thus, in equal degree, said axis of reflection to a desired angular orientation relative to the vertical.

2. A light beam orientation control apparatus as described in claim 1 in which
   said plumb mechanism is gimbal-mounted below said mirror,
   said coacting means includes a depending spindle connected to said mirror and abutting said plumb mechanism,
   the distance between the gimbal mounts of said mirror and said plumb mechanism being equal to the dimension between the gimbal mount of said plumb mechanism and the point of abutment between said plumb mechanism and said depending spindle.

3. A light beam orientation control apparatus as described in claim 1 in which said light source is mounted on an adjustment arm which is in turn mounted for rotation relative to said frame by means of a pivot near one of its ends and a screw-nut mechanism near the other of its ends, said screw-nut mechanism effective to move said adjustment arm in either direction about said pivot to effect an angular displacement thereof relative to said frame.

4. A laser beam orientation control apparatus including:
   a frame,
   a laser mounted relative to said frame to direct collimated light along an axis of incidence,
   a compensating mirror mechanism including a mirror gimbal-mounted at a first pivot plane relative to said frame and disposed in the path of light from said laser to reflect said light along an axis of reflection, said mirror mechanism including a depending spindle, a plumb mechanism gimbal-mounted at a second pivot plane below said first pivot plane relative to said frame to assume a plumb attitude relative to the earth, said plumb mechanism including a fulcrum sleeve supporting an inner peripheral fulcrum edge surrounding and in sliding contact with said depending spindle, the distances between said first and second pivot plane and between said second pivot plane and said fulcrum edge being equal whereby any angular displacement of said plumb mechanism relative to said frame is equal to twice the resulting angular displacement of said mirror relative to said frame, so that said axis of reflection remains at a constant angle with the vertical, said laser being mounted on an adjustment arm which is pivoted at one one and arcuately movable at the other, and means to effect the fine adjustment of said adjustment arm at its movable end so as to set said axis of reflection at a desired angle relative to the vertical.

* * * * *